United States Patent [19]

Milianowicz

[11] 4,384,179
[45] May 17, 1983

[54] STIFF FLEXIBLE CONNECTOR FOR A CIRCUIT BREAKER OR OTHER ELECTRICAL APPARATUS

[75] Inventor: Stanislaw A. Milianowicz, Monroeville, Pa.

[73] Assignee: Westinghouse Electric Corp., Pittsburgh, Pa.

[21] Appl. No.: 233,721

[22] Filed: Feb. 12, 1981

[51] Int. Cl.³ .............................................. H01H 9/00
[52] U.S. Cl. ........................... 200/50 AA; 200/144 B; 339/92 R
[58] Field of Search .............. 200/50 AA, 144 B, 286, 200/287, 288; 339/92 R, 92 M, 95 A, 22 B

[56] References Cited

U.S. PATENT DOCUMENTS

| | | | |
|---|---|---|---|
| 1,720,586 | 7/1929 | Allan et al. | 174/99 E |
| 2,057,266 | 10/1936 | Rippere | 174/16 B |
| 2,900,476 | 8/1959 | Reece | 200/144 B |
| 3,211,866 | 10/1965 | Crouch et al. | 200/144 B |
| 3,340,494 | 9/1967 | Gutshal | 339/95 A |
| 3,793,494 | 2/1974 | Cleaveland | 200/50 AA |

Primary Examiner—A. T. Grimley
Assistant Examiner—Morris Ginsburg
Attorney, Agent, or Firm—M. J. Moran

[57] ABSTRACT

Vacuum circuit interrupter apparatus is taught in which a movable stem is interconnected with one of the separable main contacts thereof. Flat planar flexible conductors connected in parallel circuit relationship between the stem and a fixed terminal for the circuit interrupter system are utilized. Planar members are spaced from each other for enhanced heat dissipation characteristics. Furthermore, the planar members are generally self-supporting except for the flexibility associated with a particular shape, consequently are not likely to randomly touch other apparatus in a switchgear cabinet. Nevertheless, the amount of conductor represented by the parallel planar members is sufficient to conduct electrical current when the circuit interrupter is closed.

22 Claims, 25 Drawing Figures

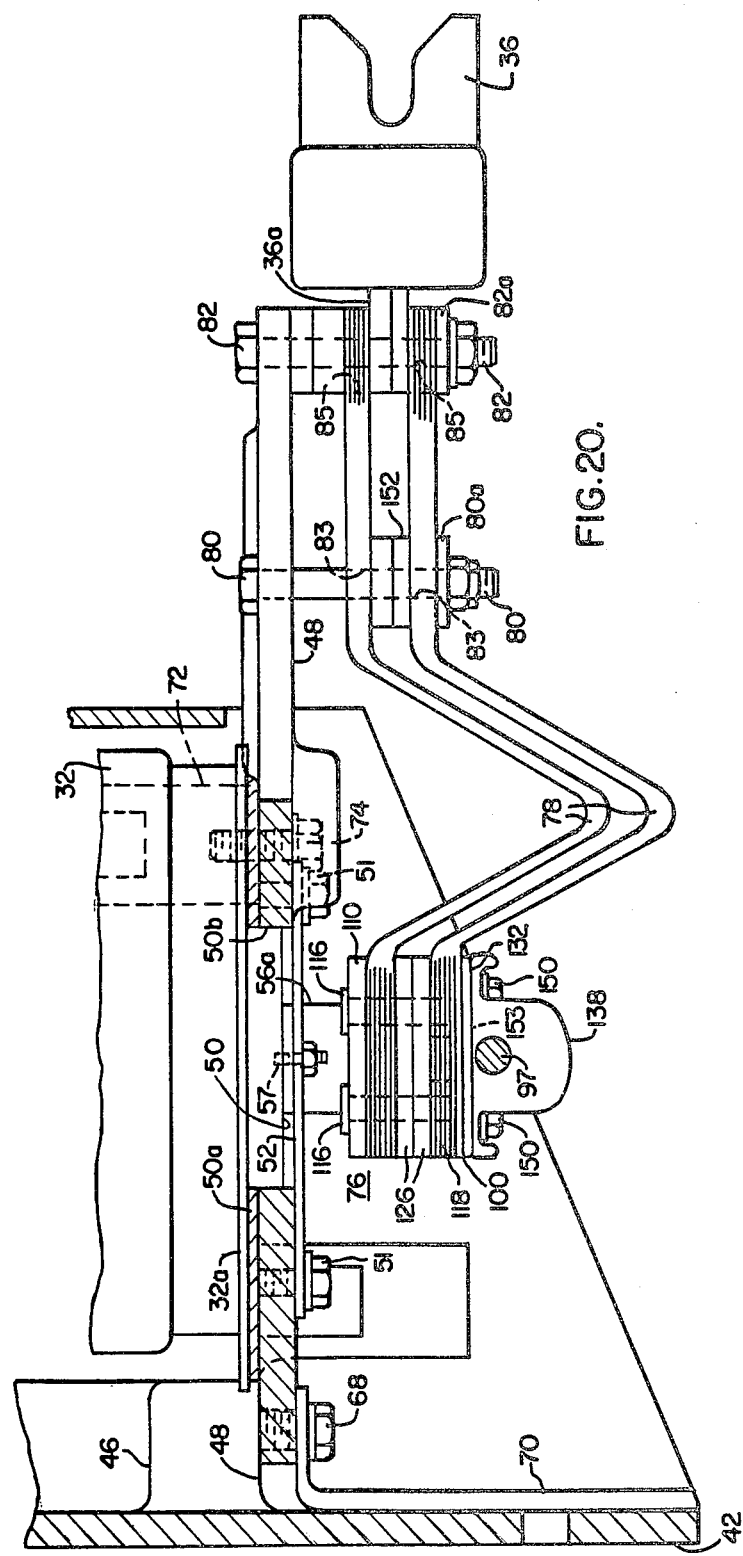

STIFF FLEXIBLE CONNECTOR FOR A CIRCUIT BREAKER OR OTHER ELECTRICAL APPARATUS

CROSS-REFERENCE TO RELATED APPLICATIONS

The subject matter of this application is related to copending concurrently filed U.S. application Ser. No. 233,723 entitled "Electrical Junction of High Conductivity For A Circuit Breaker Or Other Electrical Apparatus".

BACKGROUND OF THE INVENTION

1. Field of the Invention

The subject matter of this invention relates generally to electrical interconnection apparatus and more particularly to apparatus for flexibly interconnecting a movable circular stem with a relatively stationary terminal.

2. Description of the Prior Art

Circuit breaker apparatus in general and vacuum circuit interrupter apparatus in particular is useful for controlling and protecting electrical systems, apparatus and networks. Circuit breaker apparatus and in particular vacuum circuit interrupter apparatus include separable main contacts disposed within an insulating housing. Generally one of the contacts is fixed relative to both the housing and to an external electrical conductor which is interconnected with the circuit to be controlled by the circuit interrupter. On the other hand, the other separable main contact is movable. In the case of vacuum circuit interrupter apparatus the movable contact assembly usually comprises a stem of circular cross section having the contact at one end thereof enclosed within the vacuum chamber and a driving mechanism at the other end thereof external to the vacuum chamber. A flexible gas-tight bellows separates the vacuum chamber from the external region. The bellow expands and contracts with the movement of the stem so as to allow stem movement while at the same time retaining the integrity of the vacuum. It has been found that the circular shape of the stem is desirable for interconnection with the bellows among other things. Often the electrical interconnection between the aforementioned external apparatus or circuit to be protected by the circuit interrupter and the movable contact is made on the circular stem. It can be seen therefore that a need arises for channeling significant amounts of electrical current from a movable stem to a stationary electrical terminal or contact. One of the most popular ways to accomplish this in the prior art is to utilize a flexible conductor such as braided copper wire or the like. Examples of this may be found in U.S. Pat. No. 3,941,959 entitled "Vacuum Switching Apparatus With a Drive Unit and Ground Potential" issued Mar. 2, 1976 to Kohler et al. Another example can be found in U.S. Pat. No. 4,091,251 entitled "Vacuum Switch" issued May 23, 1978 to Amsler. Another way of tapping electrical current off a movable stem is with the aid of a sliding contact such as is described in U.S. Pat. No. 4,025,886 entitled "Electrical Circuit Breaker With Electro-Magnetically-Assisted Closing Means" issued May 24, 1977 to Barkan et al. All of the aforementioned have certain problems relative to known electrical and mechanical properties of conductors. Of particular importance are the electrical characteristic of contact resistance, the mechanical characteristic of flexibility and the general characteristic of construction cost and simplicity and their interrelationship. For example, with respect to the electrical characteristic of contact resistance it has been found that when a single electrical conductor is fastened to another electrical conductor, electrical contact is made in only three relatively small regions between the two conductors. This is regardless of the size of the common surface area of the conductors. This means that a relatively large conductor with a relatively large and inflexible surface area interconnected with another relatively large conductor and bolted in many placed thereto would still only make effective electrical contact at three regions in the contiguous surface therebetween. If on the other hand, one of the large conductors was divided into a number of independent and more flexible small conductors having the same effective surface area and were bolted independently to the other conductor each of the small conductors would now have three of its own regions of contact although the total contact resistance may not increase. However, in a case such as that the complexity and cost of the construction process would increase because multiple conductors would have to be interconnected with one conductor rather than a single conductor being interconnected with a single conductor. It would be advantageous therefore if a contact arrangement between the movable stem of a vacuum circuit interrupter, for example, and a fixed electrical terminal could be made with a flexible interconnection having multiple independent contact surfaces. With regard to flexible braided copper wires, for example, it is obvious that the flexibility is great but the relative complexity and cost of separating the braided wires into multiple separate interconnections with the movable stem increases. The problems associated with flexibility and multiple three point contact areas is exemplified in previously referred to U.S. Pat. No. 3,941,959 where a single massive interconnecting block is attached to a movable stem. The size, weight, and current carrying capabilities of the block seems to be great. However, it is to be remembered that only one three point contact arrangement is made. It would be advantageous therefore to provide apparatus for removing current from a movable circular stem to a fixed terminal by way of a flexible conductor where multiple three point electrical contact regions are established, where the manufacturing process for installation is relatively simple and where the flexible conductors are nevertheless stiff enough to prevent inadvertent contact with each other or with other apparatus in the vicinity of the circuit interrupter so that the use of insulation on the flexible electrical conductor can be avoided to thus retain flexibility and also provide enhanced heat dissipation characteristics.

SUMMARY OF THE INVENTION

In accordance with the invention electrical apparatus is taught in which there is disposed a movable electrical terminal which is movable in a given direction in relationship to a desired electrical function. There is further taught a fixed electrical terminal and also there is taught an electrically conducting member which is fixedly attached to both the movable electrical terminal and the fixed electrical terminal to interconnect both electrically. The electrically conducting member is characterized as being substantially self-supporting in a span between the movable electrical terminal and the fixed electrical terminal, but nevertheless is flexible enough in a cantilevered manner for accommodating the movement of the movable electrical terminal.

BRIEF DESCRIPTION OF THE DRAWINGS

For a better understanding of the invention, reference may be made to the accompanying drawings and to the preferred embodiments thereof exemplary of the invention shown in the accompanying drawings in which:

FIG. 20 shows a more detailed view of the stem region of the apparatus of FIG. 5 with emphasis on the cooperation of the elements shown in FIGS. 7 through 19;

DESCRIPTION OF THE PREFERRED EMBODIMENTS

Figure 1:
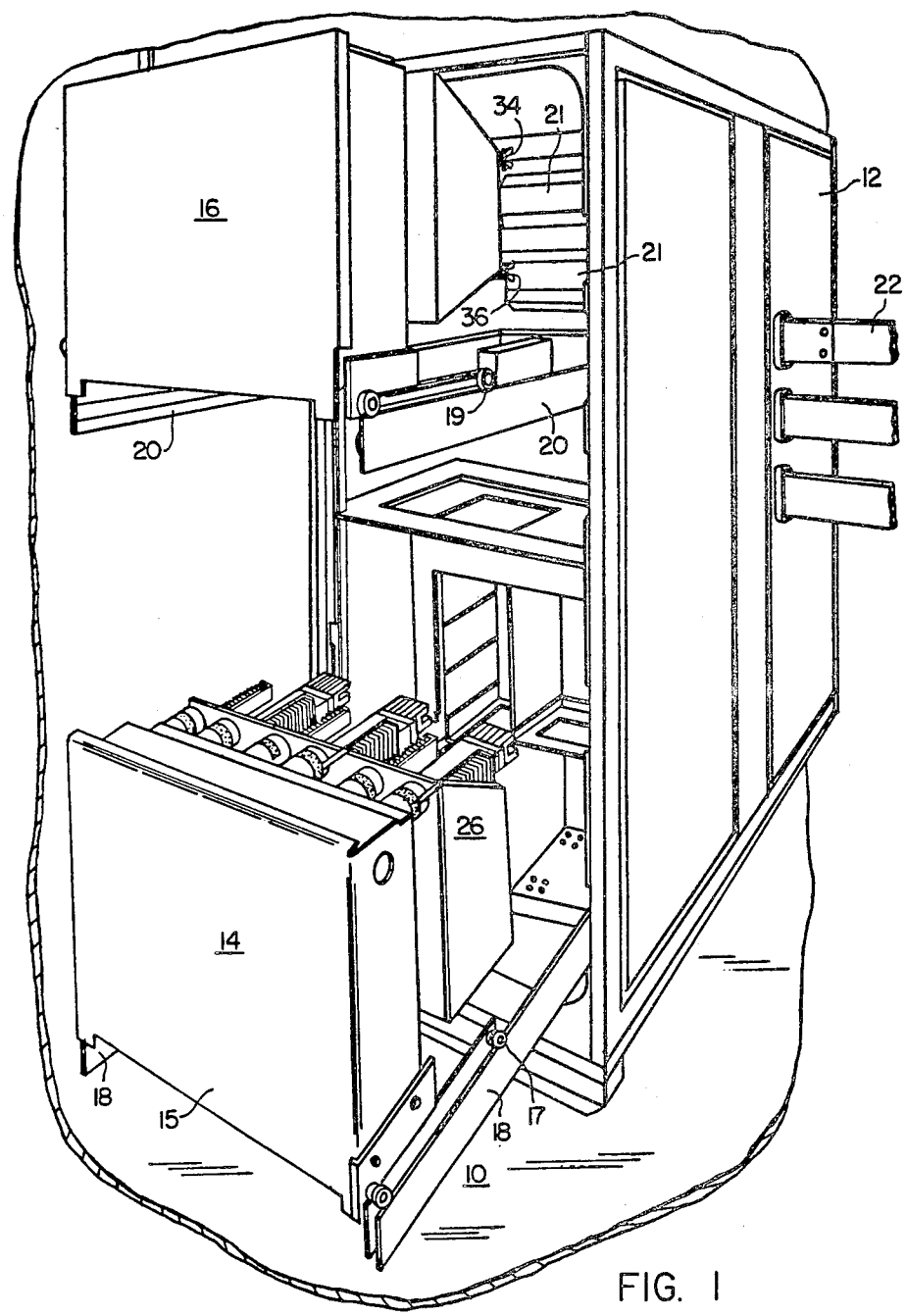
FIG. 1 shows an orthogonal front and side view of a metal enclosed circuit breaker system utilizing vacuum circuit interrupters and employing the teachings of the present invention.
Figure 2:
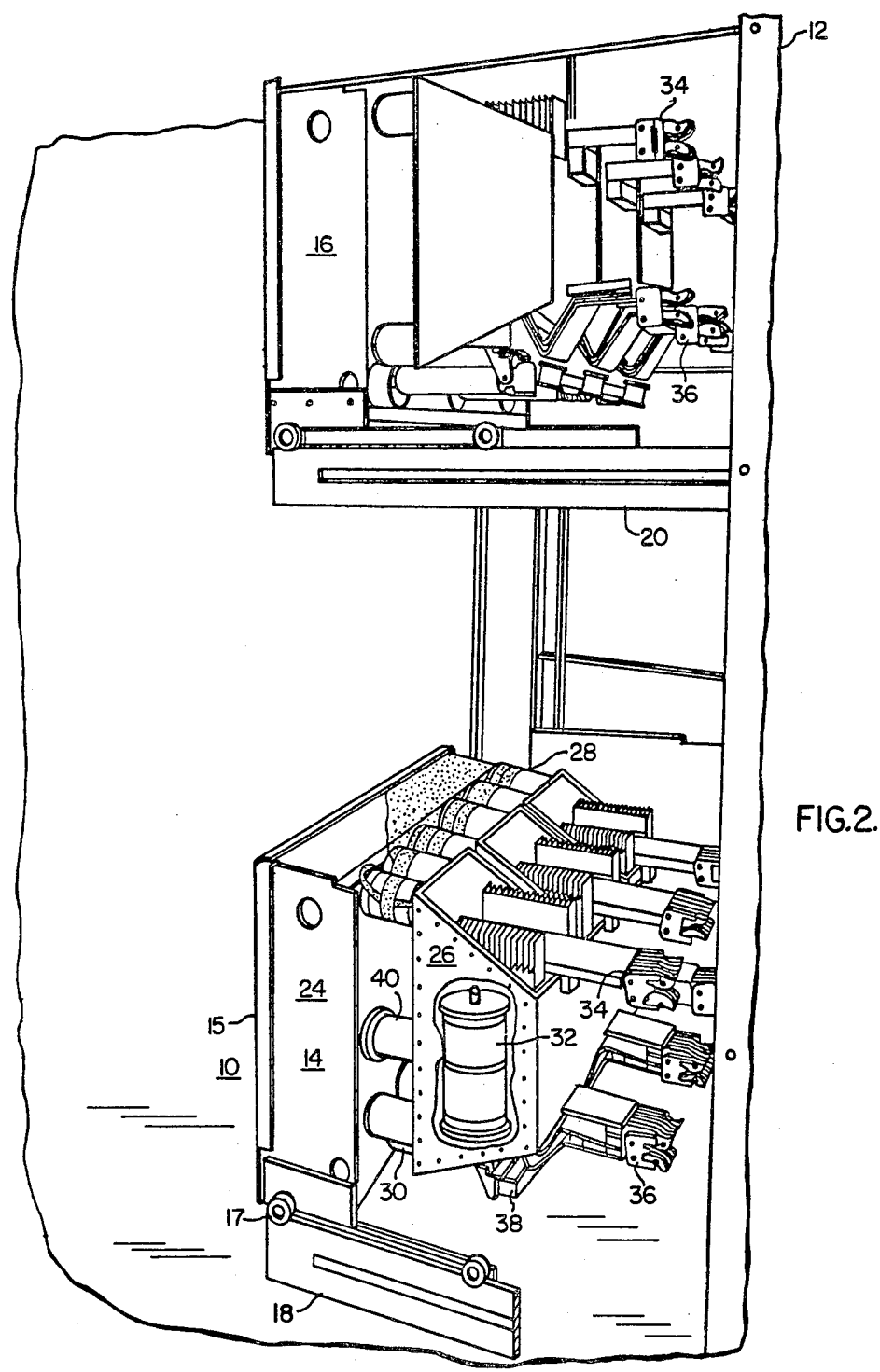
FIG. 2 shows a side orthogonal view of the apparatus of FIG. 1.

Referring now to the drawings and FIGS. 1 and 2 in particular there is shown an embodiment of the invention for metal clad or metal enclosed switchgear. In particular, there is shown a switchgear station 10 which includes a metal cabinet or enclosure 12 which may have tandemly and vertically disposed therein drawout three-phase vacuum circuit interrupter apparatus 14 and 16. The front panel 15 of the circuit apparatus may have controls thereupon for manually operating the circuit interrupter apparatus. The lower circuit interrupter apparatus 14 as shown in FIGS. 1 and 2 is movably disposed by way of wheels 17 on rails 18 for moving the circuit breaker apparatus 14 into and out of a disposition of electrical contact with live terminals (not shown) disposed in the rear of the cabinet 12. Likewise the upper circuit interrupter apparatus 16 is movably disposed by way of wheels 19 on rails 20 for moving the upper circuit interrupter apparatus into and out of a disposition of electrical contact with terminals (not shown) in the rear of metal cabinet 12. Movable shutters such as shown at 21 may be interposed between the terminals 34 and 36, for example, of either of the three-phase drawout circuit interrupters 14 and 16 for shielding the cabinet high-voltage terminals from inadvertent contact therewith when the three-phase circuit interrupters 14 and 16 have been withdrawn to the position shown in FIG. 1. Barriers 21 are mechanically moved from in front of the aforementioned terminals when the three-phase circuit interrupters 14 and 16 are moved into a disposition of electrical contact with the aforementioned high-voltage terminals.

As is best shown in FIG. 2 the three-phase circuit interrupter apparatus 14, for example, may include a front portion 24 in which controls and portions of an operating mechanism are disposed and a rear portion 26. The front portion 24 is generally a low-voltage portion and the rear portion 26 is generally a high-voltage portion. The high-voltage portion 26 is supported by and electrically insulated from the low-voltage portion 24 by way of upper and lower insulators 28 and 30, respectively. Disposed within the high-voltage or rear portion 26 are vacuum circuit interrupter bottles 32 which provide circuit interrupting capability between the three-phase terminals 34 and 36, for example. The motion and information for opening and closing the contacts of the vacuum circuit interrupter bottles 32 may be supplied by way of linkeage 38 from the front portion 24 to the rear portion 26.

Figure 3:
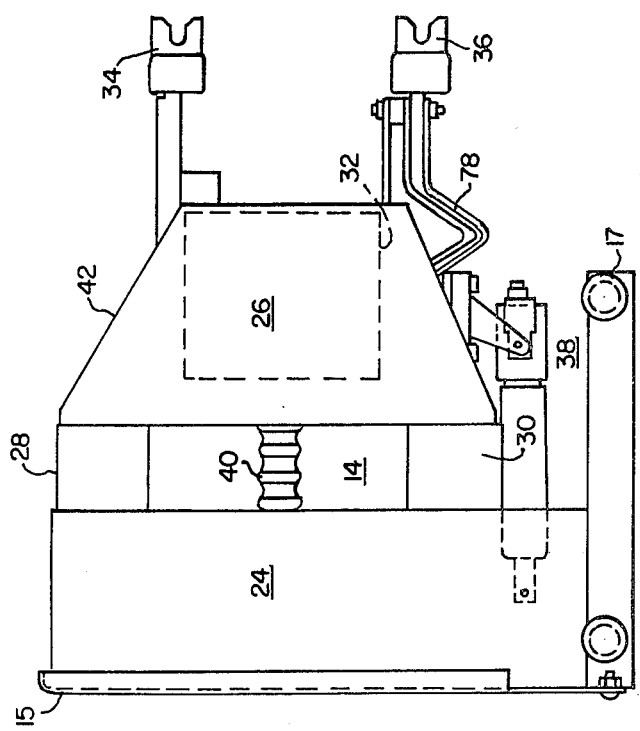
FIG. 3 shows a side elevation of the drawout circuit interrupter of FIGS. 1 and 2.
Figure 4:
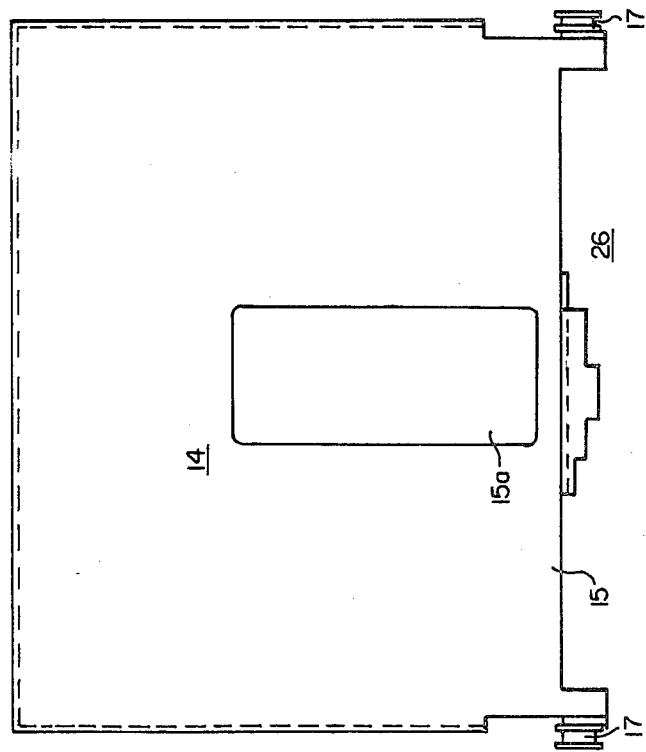
FIG. 4 shows a front elevation of the drawout circuit interrupter of FIG. 3.

Referring now to FIGS. 3 and 4, a simplified side elevation and front elevation, respectively, of the drawout circuit interrupter apparatus 14 of FIGS. 1 and 2 are shown. The linkage 38 is disposed between the low-voltage portion 24 and the high-voltage portion 26 for the purpose of conducting force which may originate in the low-voltage portion 24 to the high-voltage portion 26 for opening or closing the contacts of the vacuum circuit interrupter 32. A more detailed description of the construction and operation of the mechanism 38 is described hereinafter with respect to FIG. 6. Of particular importance with respect to the preferred embodiment of the present invention is the apparatus for interconnecting the movable stem (not shown) of the circuit interrupter apparatus 32 with the high-voltage contact 36 by way of a stiff, yet flexible, electrical conductor assembly 78.

Figure 5:
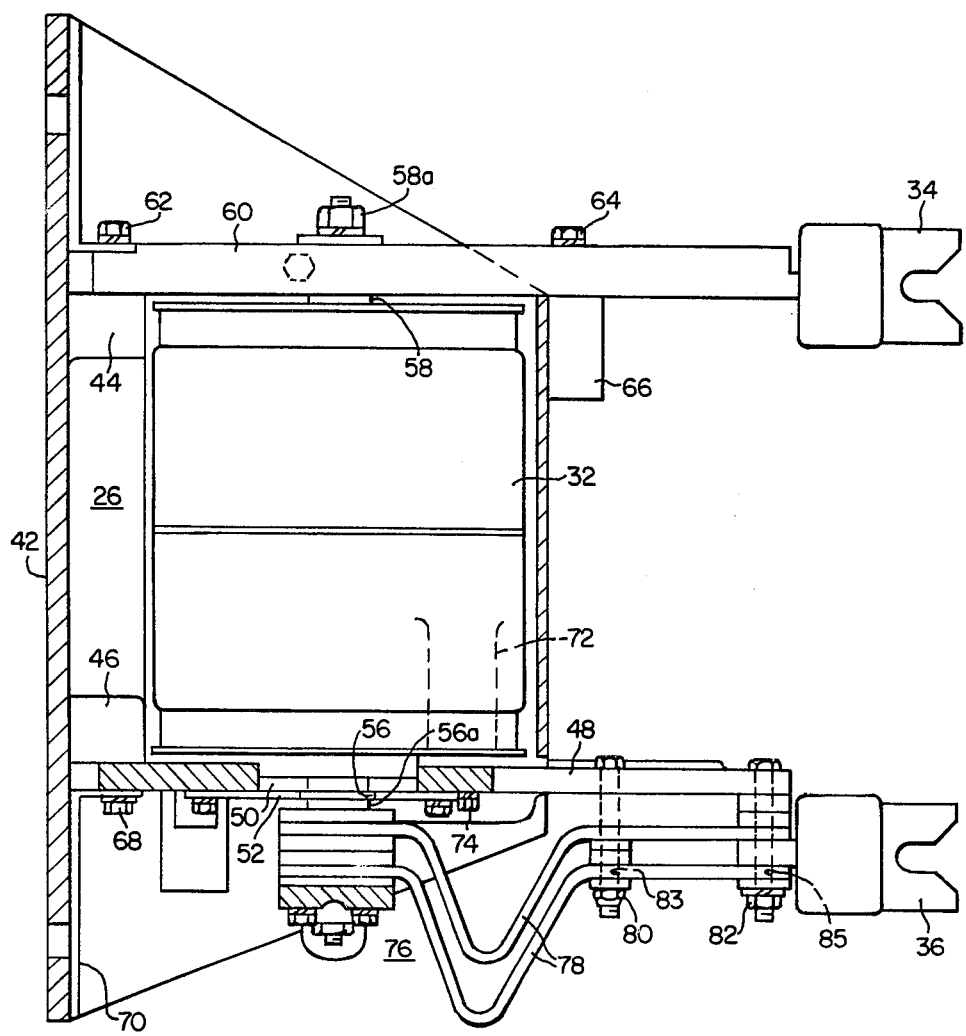
FIG. 5 shows a more detailed view of the circuit interrupter apparatus of FIGS. 2 and 3 in side elevation and partially in section.
Figure 21:
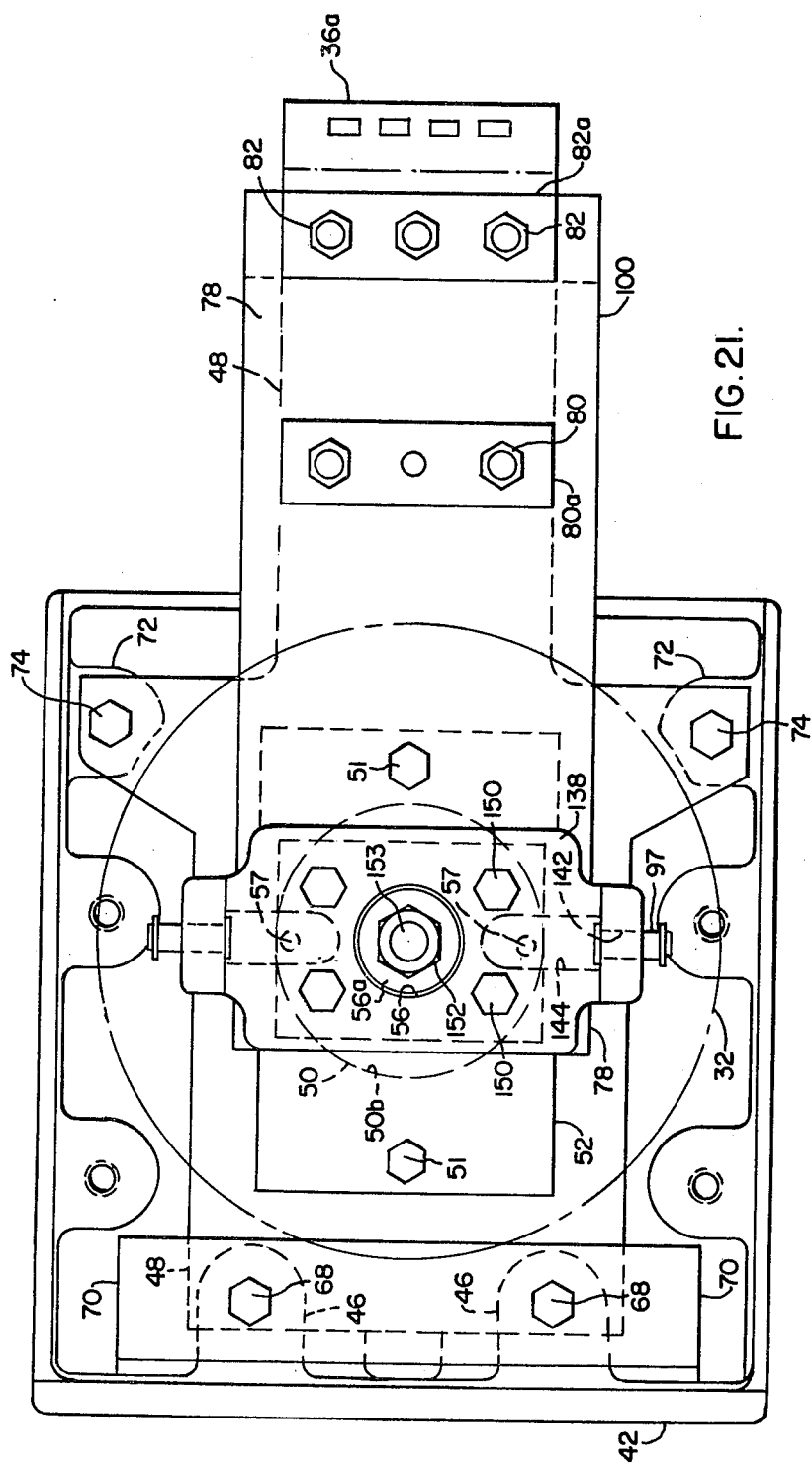
FIG. 21 shows a bottom view of the apparatus of FIG. 20.

Referring now to FIG. 5, FIG. 20 and FIG. 21, a circuit interrupter vacuum bottle 32 as well as the stiffened flexible conductor assembly 78 and an attachment device 76 are shown in detail. In particular there is provided an electrically insulated support member housing 42 having rearwardly (i.e. to the right in the figures) extending abutments 44 and 46 with vertically oriented threaded internal holes therein for accepting complementary bolt members. The lateral arrangement of abutments and bolt members is utilized to support the circuit interrupter bottle apparatus 32 and associated contact members 34 and 36, for example. A rearwardly extending support member 48 which may be aluminum, for example, is fastened by way of bolt member 68 to the bottom of the aforementioned abutment 46 at the left as shown in FIGS. 5 and 20, for example. An abutment member 72 which protrudes from the side wall of the aforementioned insulating housing 42 cooperates with a vertically oriented bolt member 74 to secure another portion of the aluminum support member 48 to a sidewall of the housing 42. The housing 42 is conveniently supported by the horizontally extending insulators 28 and 30 as is best shown in FIG. 3, for example. A circular opening 50b is disposed in the support member 48. Opening 50b has a radius generally equal to the radius of a bottom portion of the circuit interrupter vacuum bottle apparatus 32. The latter two portions interact to seat the circuit interrupter apparatus 32 in the horizontal support plate 48. A rectangular member 52 having a central circular hole 56 disposed therein is securely fastened to the underside of the support member 48 by way of bolts 51 which protrude upwardly into threaded complementary openings in the support member 48. Adjustable bolt members 57 protrude upwardly through plate 52 to adjustably bear against the aforementioned circular end portion 50 of the circuit interrupter 32 to maintain the conducting end plate 32a thereof vertically spaced from the top of the aluminum support plate 48. The vertical spacing is represented at 50a, for example, in FIG. 20. This prevents significant electrical current from flowing through the aforementioned aluminum support plate 48. The bottom contact stem 56a of the movable contact of the vacuum circuit interrupter 32 protrudes downwardly through the opening 56 in the aforementioned rectangular plate 52. Layered conductor packets or assemblies 78 are interconnected with the aforementioned stem 56a by way of the aforementioned interconnection assembly 76.

Referring now specifically to FIG. 5 it can be seen that the stiffened flexible conductor assemblies 78 are partially supported below the support member 48 by way of securing nut and bolt assemblies 80 and 82. The nut and bolt assembly 82 also interconnects the conductor assemblies 78 with the electrical terminal 36. The characteristic V-shaped pleat or undulation in the conductor assembly 78 horizontally compresses the assemblies between the assembly 76 and the terminal 36 without reducing flexibility for accommodating the travel of the stem 56a in the vertical direction. An electrically conducting support member 60 is bolted to and supported by horizontal protrusions 44 and 66 of the aforementioned electrically insulating housing member 42. Bolts 62 and 64 are provided for vertically securing member 60 to the protrusions 44 and 66 from the top, respectively. The upwardly extending stem of the generally non-moving contact of the circuit interrupter bottle 32 is securely attached to the electrically conducting member 60 by way of securing bolt 58a. Disposed at the rightward end of the electrically conducting member 60 as viewed in FIG. 5 is the aforementioned high voltage terminal 34.

Referring now to FIGS. 7 through 19 the component parts of the attachment assembly 76 and the conductor assembly 78 are depicted. By referring to these latter-mentioned Figures in conjunction with previously described FIGS. 20 and 21 the construction and operation of the stiff flexible conductors and the way they are attached to the stem 56a is described in detail.

Figure 8:
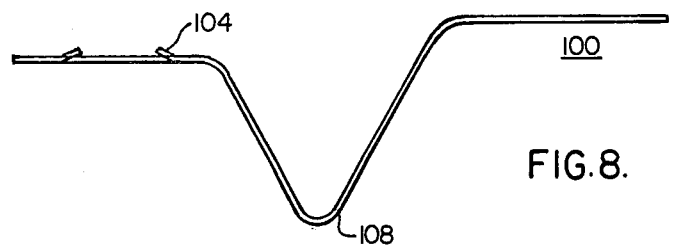
FIG. 8 shows a side view of the flexible conductor of FIG. 7.
Figure 7:
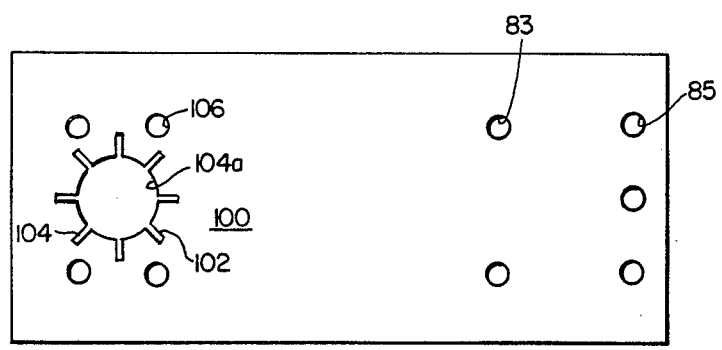
FIG. 7 shows a top view of a single flat flexible conductor for utilization with the present invention.

Referring specifically to FIGS. 7 and 8 a unitary stiff, yet flexible, electrically conducting member 100 is shown. The member 100 is stiff in that it has the characteristics of being able to support itself in the horizontal without completely drooping to the near vertical disposition as braided copper wire would do in a similar circumstance. However, it is flexible enough to accommodate a certain amount of vertical movement at one end when it is disposed in the horizontal disposition. A pleat 108 is disposed therein for purposes described previously. At one end of the relatively flat rectangular shaped thin member 100 is disposed an opening 104a having a radius slightly smaller than the radius of the stem 56a of the circuit interrupter bottle 32. Radial slits or cutouts 102 are disposed around the periphery of the opening 104a thus forming tabs 104 which are then slightly offset from the flat planar surface of the member 100 as is best shown in FIG. 8. Holes or openings 83 and 85 are disposed in the other end of the relatively flat member 100 for interconnection with the fastening apparatus 80 and 82, respectively, as was described previously with respect to FIG. 20. The use of the aforementioned tabs 104 will be described hereinafter.

Figure 10:
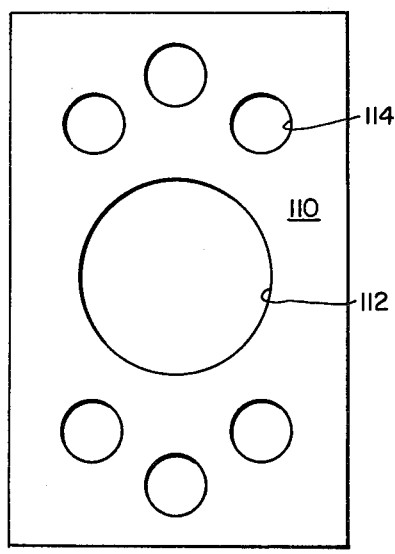
FIG. 10 shows a top view of the apparatus of FIG. 9.
Figure 9:
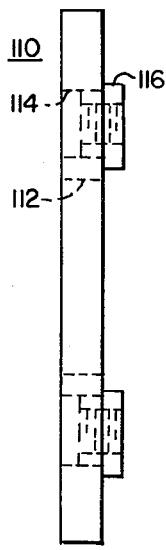
FIG. 9 shows a side elevation of a top compression part for the stem mounting apparatus utilized with the circuit interrupter of FIG. 5.

Referring now to FIGS. 9 and 10, a non-magnetic steel rectangularly shaped compression member 110 is depicted. Member 110 has a central opening 112 which is of sufficient diameter to allow the stem 56a to easily pass therethrough. Outwardly disposed therefrom are openings 114 into which are pressed internally threaded members 116 for accepting complementary threaded portions of bolt members 150 shown in FIG. 20.

Figure 12:
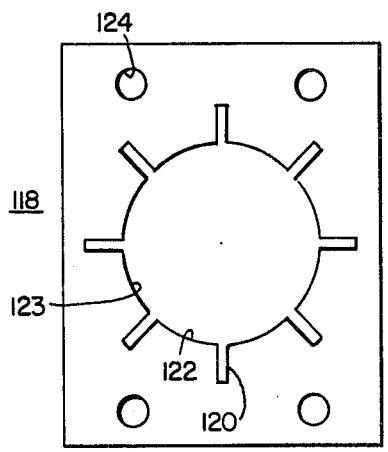
FIG. 12 shows the top view of apparatus of FIG. 11.
Figure 11:
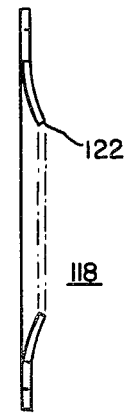
FIG. 11 shows a spacer for utilization in the apparatus of FIG. 5.

Referring now to FIGS. 11 and 12 a copper tabbed compression member 118 is shown. The copper tabbed compression member 118 has a circular central opening 123 which is generally of the same diameter as the central opening 104a of the member 100 shown in FIG. 7, for example. Slits or cutouts 120 are radially placed around the central opening 123 in a manner similar to that described with respect to the member 100 of FIG. 7. Consequently, offset tabs 122, best seen in FIG. 11, similar to tabs 104 of FIGS. 7 and 8 are formed. In a like manner outwardly disposed holes or openings 124 are placed in the member 118 for alignment with similar holes or openings 106 in the member 100. In a preferred embodiment of the invention a plurality of alternating members 100 and 118 are disposed around an axial portion of the shaft of the stem 56a of the circuit interrupter bottle 32 thus forming a flexible electrically conducting portions 78 such as shown in FIG. 20. It will be noted that the alternating arrangement of the members 100 and 118 form a plurality of separated flexible electrical conductors within each electrically conducting portion, packet or assembly 78. Each of the members 100 makes multi-point electrical contact with the stem 56a. Consequently, if there are ten of the members 100, for example, in a typical section 78, at least ten points of electrical contact will be made with the stem 5a. This means that if each contact region has three points of current flow then thirty total points of current flow exist at the interface to the stem. This has a tendency to decrease contact resistance for a given volume of electrical conductor while at the same time rendering the contact portion 78 relatively flexible. The aforementioned tab members 104 and 122 when stacked in the previously described alternating arrangement and compressed axially of the stem 56a deform to flow around the surface of the stem 56a to accommodate the smaller radius of the circular holes 123 and 104a thus, providing reduced electrical contact resistance between the members 100 and the stem 56a.

Figure 14:
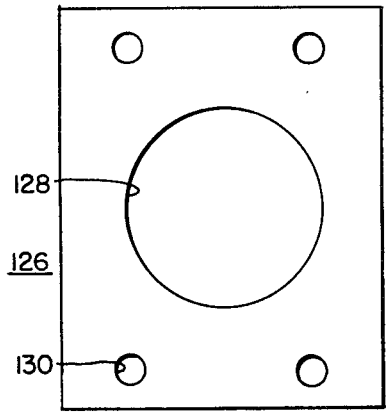
FIG. 14 shows a top view of the apparatus of FIG. 13.
Figure 13:
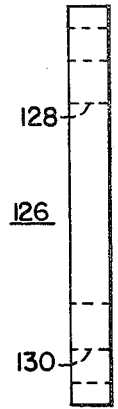
FIG. 13 shows another spacer for the utilization in the apparatus of FIG. 5.

Referring now to FIGS. 13 and 14 an intermediate compression member 126 is depicted. Member 126 has a central opening 128 which has a radius sufficiently large to allow the stem 56a to conveniently pass therethrough without deformation. Furthermore, four openings 130 may be provided which align with the openings 124 of the member 118 and the openings 106 of the conducting member 100, for example. The purpose of the utilization of the member 126 will be described more fully hereinafter.

Figure 16:
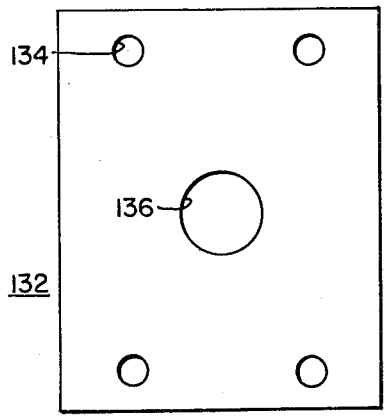
FIG. 16 shows a top view of the apparatus of FIG. 15.
Figure 15:
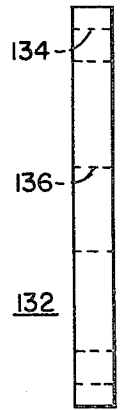
FIG. 15 shows an end spacer for the apparatus of FIG. 5.

Referring now specifically to FIGS. 15 and 16 a compression member 132 which is similar to compression member 126 is depicted. Compression member 132 differs from compression member 126 in that the central opening 136 of the compression member 132 is significantly smaller in radius than the central opening 128 of the member 126. This is due to the fact that the lower end portion of the shaft 56a has a reduced-radius threaded portion thereof which conveniently fits through the opening 136 so that the member 132 may conveniently fit over the threaded portion without fitting over the main shaft of the stem 56a. This in essence abuts the member 132 against the bottom of a significant portion of the stem 56a.

Figure 17:
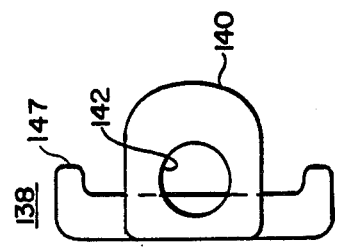
FIG. 17 shows a side view of the end plate bell crank connector for the apparatus of FIG. 5.
Figure 19:
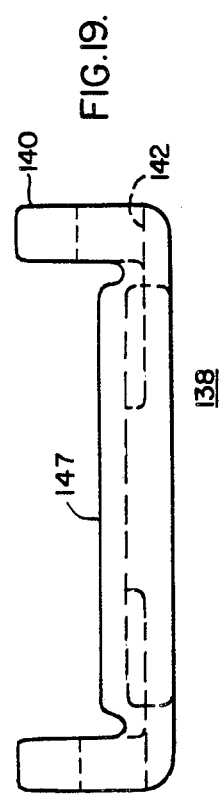
FIG. 19 shows a front elevation of the apparatus of FIG. 17.
Figure 18:
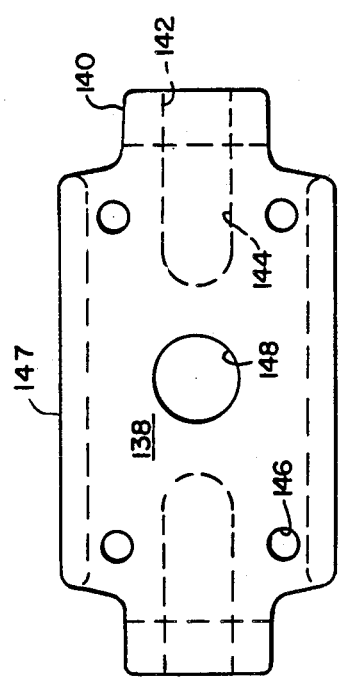
FIG. 18 shows a top view of the apparatus of FIG. 17.

Referring now to FIGS. 17, 18 and 19, a metal bell crank-to-stem force transfer member 138 is depicted. Member 138 has vertically rising lips 147 on two opposing sides thereof and relatively larger vertically rising members 140 on the other two opposing sides thereof. Holes or opening 146 which align with the previously described holes or openings 130, 134, 124 and 106 are provided. Furthermore, a central opening 148 which fits around the reduced threaded portion of the shaft 56a much in the way that the hole 136 of member 132 does is also shown. In the vertically rising portions 140 a circular hole 142 is disposed for interconnection with pivot pins 97 of the bell crank assembly in a manner to be described hereinafter with respect to FIG. 6.

Referring once again to FIG. 20 the inter-cooperation of the elements of FIGS. 7 through 19 in forming the electrically conducting tap-off assembly 76 is described. In the construction process the central opening 112 of the member 110 is passed along the shaft 56a. Next, a plurality of stacked alternating members 110 and 118 are slid over the shaft 56a. It is to be noted with respect to the tabs 122 and 104 of members 118 and 100, respectively, that the offset thereof from the flat surface slightly increases the diameter of the holes 123 and 104a, respectively, so that the stacked alternating members may be easily slid over the shaft 56a. Next, in a preferred embodiment of the invention two spacers 126 are slipped onto the shaft. Next, another assembly 78 which includes alternating members 100 and 118 are formed along the shaft in a manner previously discussed. Next, electrically conducting member 132 with its reduced central opening 135 is disposed over the threaded portion of the shaft 56a and abuts against the shoulder between the reduced threaded portion and the enlarged shaft of the member 56a. Finally, in this embodiment of the invention the member 138 is disposed in a manner shown with respect to FIG. 20 and a bolt (not shown in FIG. 20) is disposed over the reduced threaded portion of the member 56a thus compressing the main body of the member 138 against the member 132 and thus against the lower shoulder of the shaft 56a thus securing the latter two members to the shaft 56a. Lastly, bolt members 150 are fed through holes 146 of member 138, holes 134 of member 132, holes 106 of member 100, holes 124 of member 118, holes 130 of member 126 and finally into the threads of the lipped members 116 of the uppermost compression member 110. The bolts 150 are then drawn tight thus compressing or sandwiching all of the aforementioned members together causing the aforementioned tabs 104 and 122 to align themselves with the planes of the surface in which they are disposed thus causing the openings 104a and 123 to reduce in radius thus causing the edges of the tabs to cold flow or inelastically deform around the stem 56a. This then provides a convenient way to interconnect a circular vertically moving member 56a with a relatively stationary terminal such as 36 shown in FIG. 20. This is done with a high degree of reduced electrical surface contact resistance and with sufficient flexibility to allow the shaft 56a to move upwardly and downwardly (with respect to FIG. 20) to thus accommodate the opening and closing of the contacts of the circuit interrupter bottle 32. A single non-layered assembly for replacing assembly 78 would be too stiff to accommodate the movement of the stem 56a. The geometry of assembly 78 is such that each member 100 therein can independently move in a limited way between the stem 56a and the first tie down point at 80.

Figure 6:
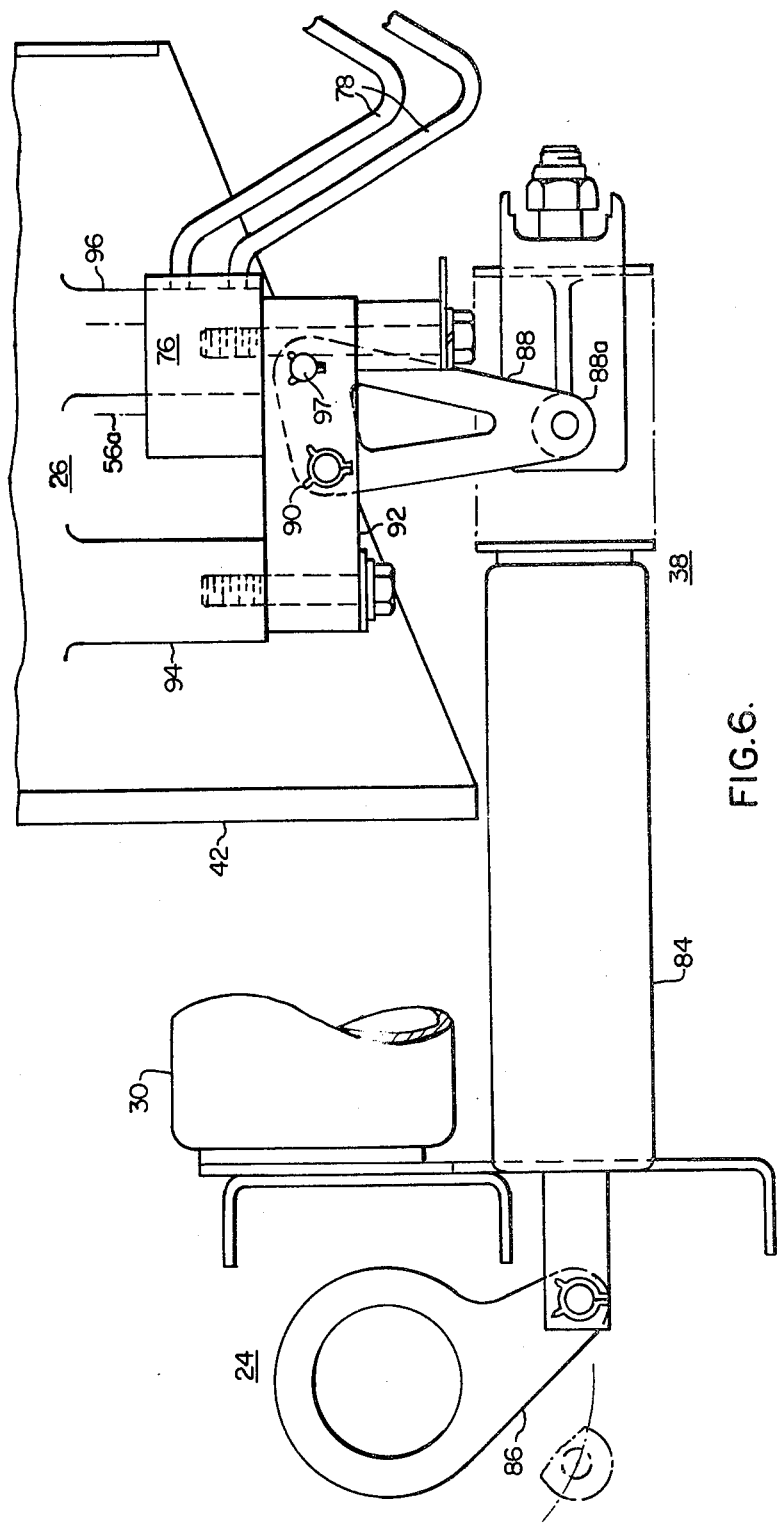
FIG. 6 shows detailed view of the bell crank apparatus for the circuit interrupter of FIG. 5.

Referring now to FIG. 6 the linkage arrangement 38 for interconnecting the circuit interrupter of the high-voltage section 26 with a force providing apparatus such as a motor or crank in the low-voltage section 24 is shown. A crankshaft member 86 may be pivotally attached to an insulating rod 84 the other end of which is interconnected with one pivot pin 88a of a bell crank 88. There are disposed in the previously mentioned insulating housing support member 42 two vertical protrusions 94 and 96 which are utilized to vertically support an insulating base 92 on which the aforementioned bell crank 88 is pivoted at 90. A third pivot 97 of the bell crank member 88 is interconnected with the member 138 (not shown) in the journals 142 (not shown) thereof so that the shaft 56a may move upwardly and downwardly as viewed in FIG. 6 as the crank mechanism 86 rotatates causing the insulating shaft 84 to move in a substantially horizontal direction is shown in FIG. 6. Of course, as shaft 56a moves upwardly and downwardly the electrically interconnecting attachment device 76 and its associated stiff flexible contact portions 78 move upwardly and downwardly in a corresponding fashion. Were it not for the flexibility of the portion 78 the member 76 would deter or prevent the stem 56 from operating under the influence of the bell crank 88. Regardless of the flexibility of the member 78, however, the unique arrangement of the interconnection in the interconnecting device 76 provides for low resistance contact between the stem 56a and the flexible conductors 78.

Figure 22:
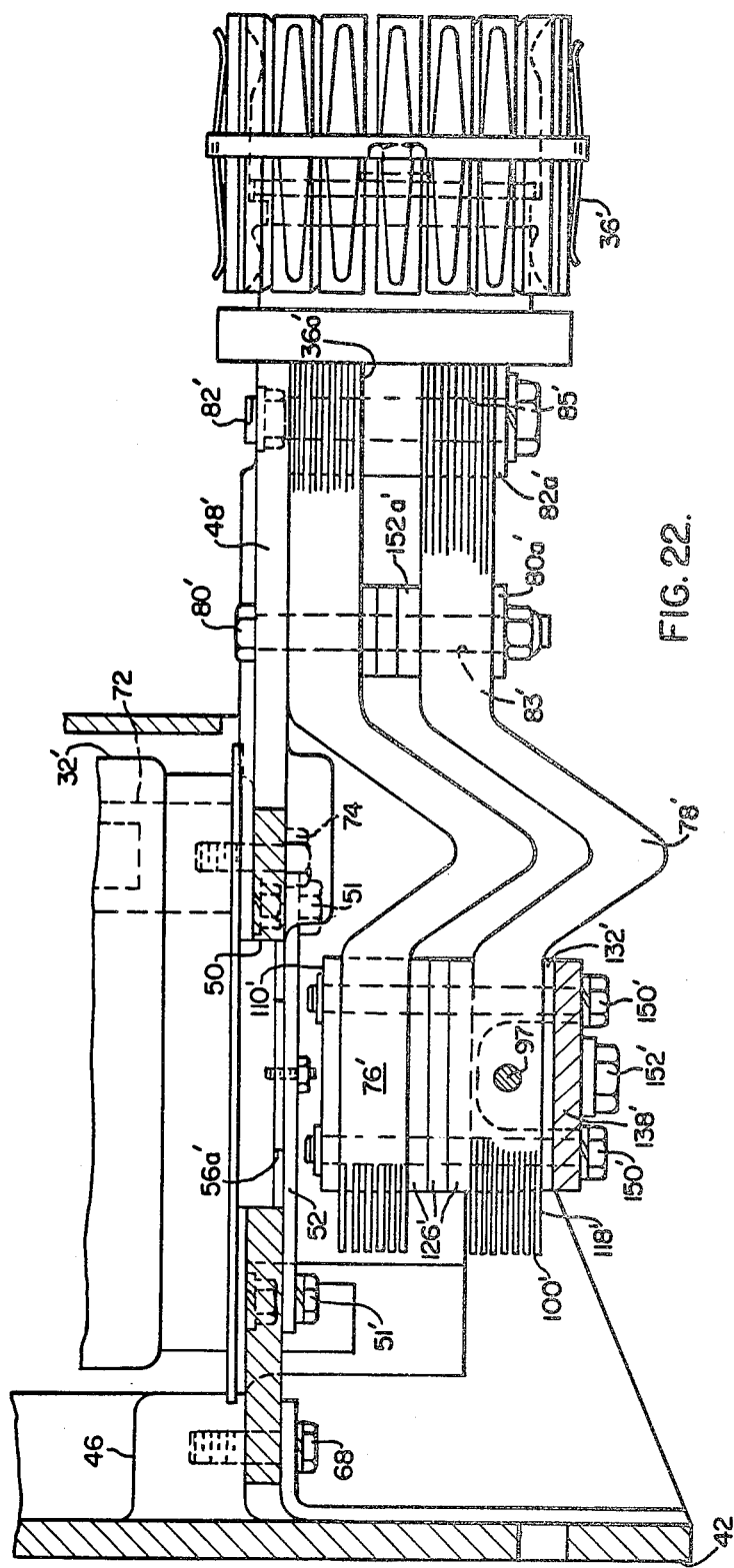
FIG. 22 shows a view similar to that shown in FIG. 20 but for the second embodiment of the invention.
Figure 23:
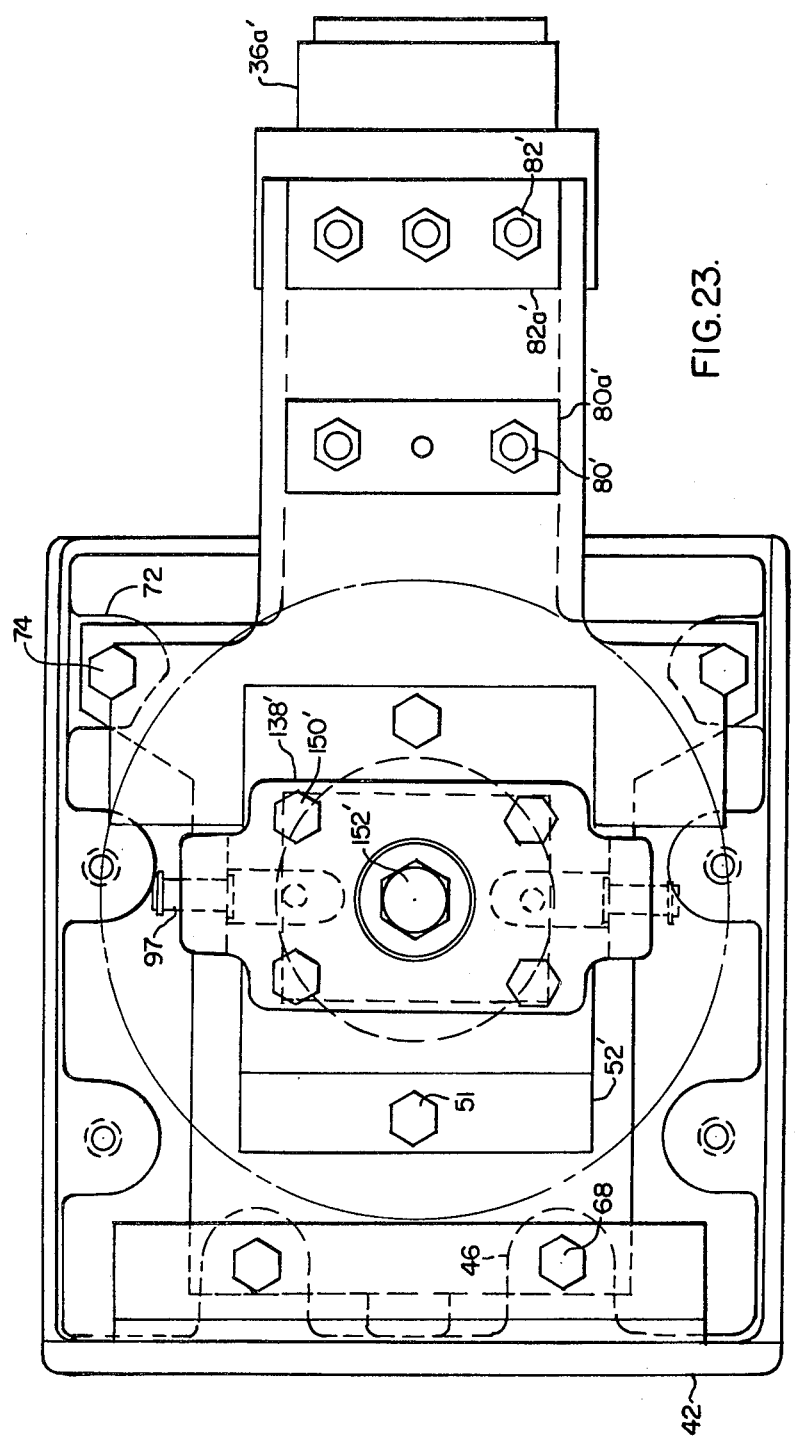
FIG. 23 shows a bottom view of the apparatus of FIG. 22.

Referring now to FIGS. 22 and 23 another embodiment of the invention is shown which is useful for relatively higher ranges of operating current. Generally like elements are identified by like reference symbols in regard to other embodiments and drawings of this invention. On the other hand elements which are merely related but not similar are identified with primed (') reference symbols. For example, the circuit interrupter bottle of the embodiment of FIGS. 22 and 23 is identified by the reference symbol 32' indicating that it is different from the circuit interrupter 32 of other embodiments and other Figures. Generally, elements 100', 110' and 118', 126' 132' and 138' are similar but relatively larger than elements 100, 110, 118, 126, 132 and 138 of FIGS. 20 and 21. Two notable differences lie in the fact that the central circular opening in the present case is larger than the corresponding central circular openings 104a, 112, 123, 128, 136 and 148, respectively. Further, the bolt holes in the present embodiment are slightly larger in diameter and further offset from the center of each element than the corresponding bolt holes 106, 114, 124, 130, 134 and 146 of the embodiments of FIGS. 20 and 21. Still further differences lie in the fact that three spacer elements 126' are utilized rather than two, and that more interleaved combinations of the elements 118' and 100" are utilized per packet or portion of flexible electrical conductor 78' than in the other embodiment of the invention and that the bell crank interconnecting insulating device 138' is utilized in a reversed or upside down disposition relative to the embodiments of FIGS. 20 and 21. With regard to the interconnection of the electrically conducting flexible portions or packets 78' in the present embodiment of the invention it should be noted that the aforementioned portions 78' are interconnected with a main terminal 36' at interconnecting portion 36a' by the utilization of an interconnecting bolt 85 and fastening apparatus 82'. Spacers 152a' associated with bolt 80' also differ from the spacer arrangement shown with regard to FIG. 20, for example. It is also to be noted that the terminal 36' is of a larger size and different construction than the terminal 36 of FIG. 20, for example. Otherwise, the operation of the apparatus shown in FIG. 22 is similar to the operation of the apparatus shown in FIG. 20 in that a bell crank member (not shown) interconnected at 97 with the interconnecting member 138' is utilized to cause the stem 56a' to move upwardly and downwardly to close and open, respectively, the contacts of the vacuum circuit interrupter apparatus bottle 32' while the flexible conductors of the packets or portions 78' move or flex accordingly.

Figure 24:
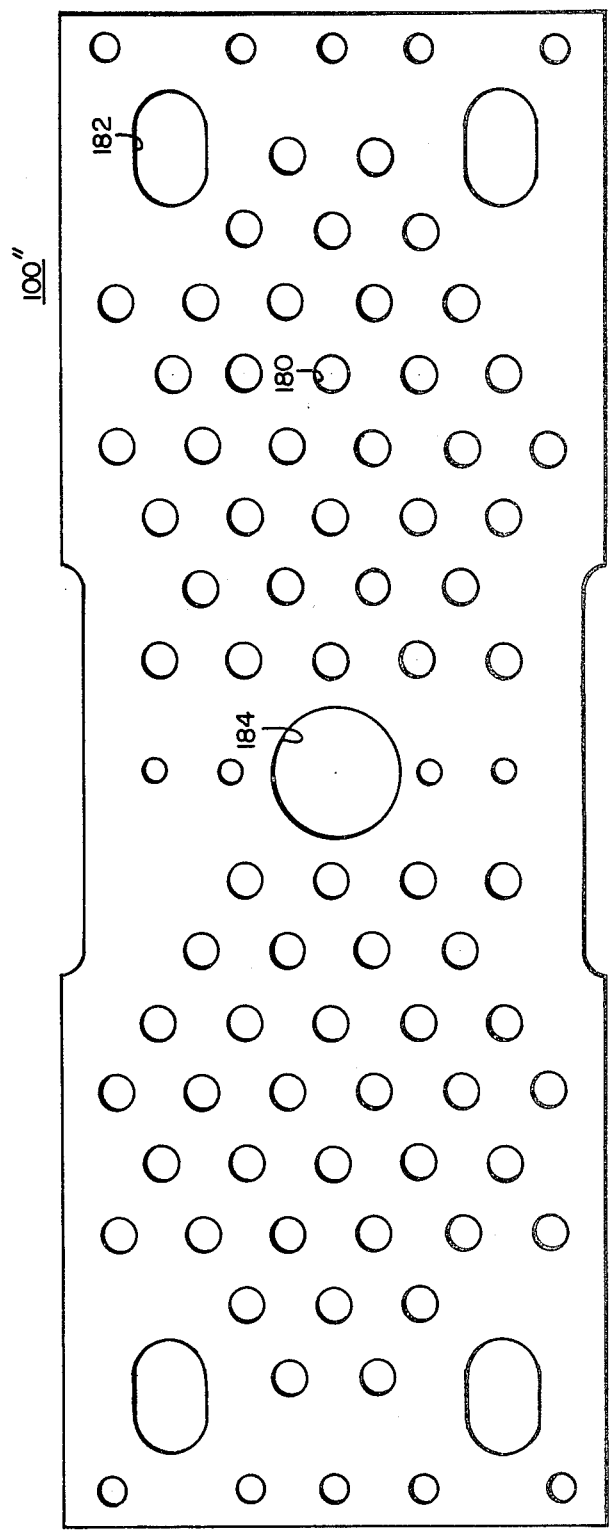
FIG. 24 shows a flexible conductor similar to that shown in FIG. 7 but for a third embodiment of the invention.
Figure 25:
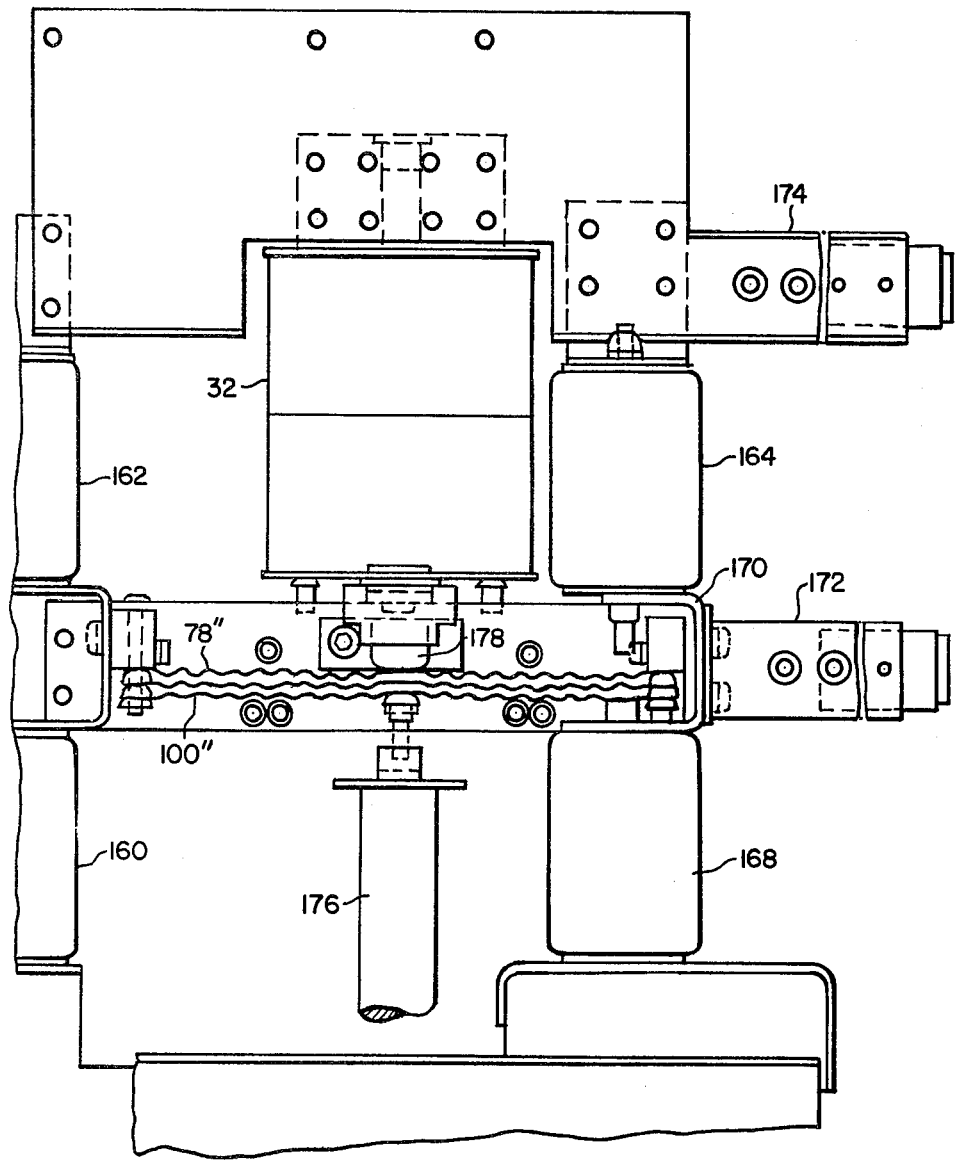
FIG. 25 shows side elevation of circuit breaker apparatus utilizing the flexible conductor of FIG. 24.

Referring now to FIGS. 24 and 25 still another embodiment of the invention is shown in which a vacuum circuit interrupter 32 is disposed electrically between two high-voltage terminals 172 and 174. The aforementioned high-voltage terminals and vacuum interrupter are insulatingly spaced apart at appropriate places by the insulators 160, 162, 164 and 168. Electrical interconnecting apparatus shown at 178 is utilized in cooperation with an insulating movement providing means 176 to cause packets 78" of stiff flexible conductors 100" to conduct current for the circuit interrupter bottle 32. By reference to FIG. 24 a top view of a stiff flexible conductor 100" is shown. Four holes 182 are disposed at the ends of the conductor 100" and a central hole 184 is disposed in the center to accomodate the interconnection between the force providing apparatus 176 and the stem interconnection apparatus 178 of FIG. 25. Because of the relatively large current carrying capabiity of the conductor 100" offset holes 180 are disposed in the main body of the conductor to assist in dissipating heat. Furthermore, as is best seen in FIG. 25 the entire conductor 100" is disposed between the insulators 160 and 168 to provide a larger heat radiating surface than would normally be found if the conductor were merely disposed between the connecting portion 178 and the insulator 168. This means that electrical current substantially flows in that portion of the conductor 100" between the connecting member 178 and the terminal 172, for example, while virtually no current flows to the left towards insulator 160. As can also be seen in FIG. 25 the conductors 100" are fabricated to have an accordion-shaped, pleated-shaped or undulating side elevation. This not only enhances the heat dissipation characteristics but provides for utilizing the entire flexible characteristic of the conductor 100" while reducing the distance between the members 178 and 172, for example.

It is to be understood with respect to the embodiments of this invention that the concepts taught here are not limited to use with vacuum circuit interrupters. Moreover, it is to be understood that the number of pleats or undulations as shown in the various embodiments of this invention are not limiting. It is also to be understood that the materials described herein for utilization in the embodiments of the invention are not limiting other than as specifically set forth.

The apparatus taught with respect to the embodiments of this invention has many advantages. One advantage lies in the fact that current may be transferred from a movable terminal stem or conductor to a relatively fixed conductor by utilizing the teachings of the present invention. Another advantage lies in the fact that a contact resistance in the current carrying capabilities of a given amount of electrical conductor may be retained while the conductor is rendered more flexible by utilizing the concepts of the teachings of this invention. Another advantage lies in the fact that higher ratings may be enjoyed for a given amount of electrical conductor and for given space limits by utilizing the concepts of the teachings of this invention.

What I claim as my invention is:

1. A circuit interrupter system, comprising:
    circuit interrupter means including separable contacts one of which is interconnected with a movable external stem, where said stem has a given cross sectional shape;
    fixed electrical terminal means;
    an uninsulated external conductor of given length connected to said external stem and to said fixed electrical terminal means, said conductor having a generally flat planar portion with an opening therein which is generally of the same cross-sectional shape as said stem but slightly smaller in cross sectional area, the periphery of said opening having a slit therein which provides a peripheral tab which is offset from the plane of said flat planar portion when said opening is initially disposed around said stem to thus initially accommodate for the difference in area, said external conductor being characterized as being substantially self-supporting in the span between said movable stem and said fixed electrical terminal means but nevertheless being flexible in a cantilever manner for accommodating the movement of said movable stem; and
    compression means disposed upon said stem in a disposition for causing said tab to substantially realign with said plane of said planar portion, the material of said tab assuming a flowed state in the region of the interface between said tab and said stem after compresssion to accommodate for the difference in area.

2. The combination as claimed in claim 1 wherein the length-to-thickness ratio of external conductor is sufficient to allow said movable stem to move through a predetermined distance without incurring significant mechanical resistance to said movement from said external conductor.

3. The combination as claimed in claim 2 wherein said span is shorter than said length, said external conductor having a lengthwise undulation therein to accommodate said length within said span.

4. The combination as claimed in claim 2 comprising a plurality of said external conductors stacked in the direction of said movement, the surface of each being relatively movable in the lengthwise direction to accommodate the flexible movement of each.

5. The combination as claimed in claim 2 wherein said external conductor comprises a hole therein for enhanced heat dissipation.

6. The combination as claimed in claim 3 wherein said external conductor comprises a hole therein for enhanced heat dissipation.

7. The combination as claimed in claim 4 wherein at least one of said external conductors comprises a hole therein for enhanced heat dissipation.

8. The combination as claimed in claim 6 comprising a plurality of said external conductors stacked in the direction of said movement, the surface of each being relatively movable in the lengthwise direction to accommodate the flexible movement of each.

9. The combination as claimed in claim 1 comprising a plurality of said slits.

10. The combination as claimed in claim 1 wherein said cross-sectional shape is circular.

11. The combination as claimed in claim 9 wherein said cross-sectional shape is circular.

12. Metal clad switchgear, comprising:
   metal cabinet means;
   cabinet terminal means disposed in said cabinet means;
   circuit interrupter means including separable contacts, one of which is interconnected with a movable external stem, where said stem has a given cross sectional shape;
   an uninsulated external conductor of given length connected to said external stem and to said cabinet terminal means, said conductor having a generally flat planar portion with an opening therein which is generally of the same cross-sectional shape as said stem but slightly smaller in cross sectional area, the periphery of said opening having a slit therein which provides a peripheral tab which is offset from the plane of said flat planar portion when said opening is initially disposed around said stem to thus initially accommodate for the difference in area, said external conductor being characterized as being substantially self-supporting in the span between said movable stem and said cabinet terminal means but nevertheless being flexible in a cantilever manner for accommodating the movement of said movable stem; and
   compression means disposed upon said stem in a disposition for causing said tab to substantially realign with said plane of said planar portion, the material of said tab assuming a flowed state in the region of the interface between said tab and said stem after compression to accommodate for the difference in area.

13. The combination as claimed in claim 12 wherein the length-to-thickness ratio of said external conductor is sufficient to allow said movable stem to move through a predetermined distance without incurring significant mechanical resistance to said movement from said external conductor.

14. The combination as claimed in claim 13 wherein said span is shorter than said length, said external conductor having a lengthwise undulation therein to accommodate said length within said span.

15. The combination as claimed in claim 13 comprising a plurality of said external conductors stacked in the direction of said movement, the surface of each being relatively movable in the lengthwise direction to accommodate the flexible movement of each.

16. The combination as claimed in claim 13 wherein said external conductor comprises a hole therein for enhanced heat dissipation.

17. The combination as claimed in claim 14 wherein said external conductor comprises a hole therein for enhanced heat dissipation.

18. The combination as claimed in claim 15 wherein at least one of said external conductors comprises a hole therein for enhanced heat dissipation.

19. The combination as claimed in claim 17 comprising a plurality of said external conductors stacked in the direction of said movement, the surface of each being relatively movable in the lengthwise direction to accommodate the flexible movement of each.

20. The combination as claimed in claim 12 comprising a plurality of said slits.

21. The combination as claimed in claim 12 wherein said cross-sectional shape is circular.

22. The combination as claimed in claim 20 wherein said cross-sectional shape is circular.

* * * * *